US012411887B2

(12) United States Patent
Yang et al.

(10) Patent No.: US 12,411,887 B2
(45) Date of Patent: Sep. 9, 2025

(54) TRANSFORMER-BASED OBJECT DETECTION

(71) Applicant: Lemon Inc., Grand Cayman (KY)

(72) Inventors: Linjie Yang, Los Angeles, CA (US); Yiming Cui, Los Angeles, CA (US); Haichao Yu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 270 days.

(21) Appl. No.: 18/057,008

(22) Filed: Nov. 18, 2022

(65) Prior Publication Data

US 2024/0168991 A1 May 23, 2024

(51) Int. Cl.
| | |
|---|---|
| *G06V 10/77* | (2022.01) |
| *G06F 16/538* | (2019.01) |
| *G06V 10/42* | (2022.01) |
| *G06V 10/764* | (2022.01) |
| *G06V 10/774* | (2022.01) |
| *G06V 10/82* | (2022.01) |
| *G06V 20/70* | (2022.01) |

(52) U.S. Cl.
CPC .......... *G06F 16/538* (2019.01); *G06V 10/42* (2022.01); *G06V 10/7715* (2022.01); *G06V 10/774* (2022.01); *G06V 10/82* (2022.01); *G06V 20/70* (2022.01)

(58) Field of Classification Search
CPC ...... G06F 16/538; G06F 16/532; G06F 16/53; G06F 16/583; G06V 10/42; G06V 10/7715; G06V 10/774; G06V 10/82; G06V 20/70
See application file for complete search history.

(56) References Cited

U.S. PATENT DOCUMENTS

| | | | | |
|---|---|---|---|---|
| 11,886,488 | B2 * | 1/2024 | Juan | G06V 20/30 |
| 2022/0019889 | A1 * | 1/2022 | Aum | G06N 3/063 |
| 2023/0206456 | A1 * | 6/2023 | Lee | G06V 10/764 |
| | | | | 382/266 |

OTHER PUBLICATIONS

Wang, Y., et al. "Anchor detr: Query design for transformer-based object detection. arxiv 2021." arXiv preprint arXiv:2109.07107 3. (Year: 2022).*
Liu, Zhengyi, et al. "TriTransNet: RGB-D salient object detection with a triplet transformer embedding network." Proceedings of the 29th ACM international conference on multimedia. 2021. (Year: 2021).*
Carion, Nicolas, et al. "End-to-end object detection with transformers." European conference on computer vision. Cham: Springer International Publishing, 2020. (Year: 2020).*
Meinhardt, Tim, et al. "TrackFormer: Multi-Object Tracking with Transformers." 2022 IEEE/CVF Conference on Computer Vision and Pattern Recognition (CVPR). IEEE, 2022. (Year: 2022).*
Wang, Y., et al. "Anchor detr: Query design for transformer-based object detection. arxiv 2021." arXiv preprint arXiv:2109.07107 3. (Year: 2022) (Year: 2022).*

(Continued)

*Primary Examiner* — Stephen R Koziol
*Assistant Examiner* — Joshua Chen
(74) *Attorney, Agent, or Firm* — Fish & Richardson P.C.

(57) ABSTRACT

Object detection using a transformer-based object detection model includes randomly initializing basic queries for the model, modulating the basic queries based on semantics of input images, and training the model basic on features extracted from input images and the modulated queries.

16 Claims, 5 Drawing Sheets

(56) References Cited

OTHER PUBLICATIONS

Liu, Zhengyi, et al. "TriTransNet: RGB-D salient object detection with a triplet transformer embedding network." Proceedings of the 29th ACM international conference on multimedia. 2021. (Year: 2021) (Year: 2021).*

Carion, Nicolas, et al. "End-to-end object detection with transformers." European conference on computer vision. Cham: Springer International Publishing, 2020. (Year: 2020) (Year: 2020).*

Meinhardt, Tim, et al. "TrackFormer: Multi-Object Tracking with Transformers." 2022 IEEE/CVF Conference on Computer Vision and Pattern Recognition (CVPR). IEEE, 2022. (Year: 2022) (Year: 2022).*

Zhi Tian et al. Conditional convolutions for instance segmentation. In Proc. Eur. Conf. Computer Vision (ECCV), Jul. 2020. (18 pages).

Yingming Wang et al. Anchor DETR: Query design for transformer-based object detection. arXiv preprint arXiv:2109.07107, Jan. 2022. (8 pages).

Tsung-Yi Lin et al. Microsoft COCO: Common objects in context. In European conference on computer vision, pp. 740-755. Springer, Feb. 2015.

Xizhou Zhu et al. Deformable DETR: Deformable transformers for end-to-end object detection. In International Conference on Learning Representations, Mar. 2021. (16 pages).

Bowen Cheng et al. Mask2former for video instance segmentation. Dec. 2021. (3 pages).

Shilong Liu et al.. DAB-DETR: Dynamic anchor boxes are better queries for DETR. In International Conference on Learning Representations, Mar. 2022. (19 pages).

Yinpeng Chen et al. Dynamic convolution: Attention over convolution kernels. In Proceedings of the IEEE/CVF Conference on Computer Vision and Pattern Recognition, pp. 11030-11039, Mar. 2020.

Linjie Yang et al. Video instance segmentation. In Proceedings of the IEEE International Conference on Computer Vision, pp. 5188-5197, Aug. 2019.

Marius Cordts et al. The cityscapes dataset for semantic urban scene understanding. In Proc. of the IEEE Conference on Computer Vision and Pattern Recognition (CVPR), Apr. 2016. (29 pages).

Alexander Kirillov et al. Panoptic segmentation. In Proceedings of the IEEE/CVF Conference on Computer Vision and Pattern Recognition, pp. 9404-9413, Apr. 2019.

Peng Gao et al. Fast convergence of DETR with spatially modulated co-attention, 2021. (10 pages).

Kaiming He et al. Mask R-CNN. In Proceedings of the IEEE international conference on computer vision, pp. 2961-2969, Jan. 2018.

Yuxin Fang et al. Tracking Instances as Queries. In Proceedings of the IEEE/CVF International Conference on Computer Vision (ICCV), pp. 6910-6919, Jun. 2021.

Yuwen Xiong et al. UPSNet: A unified panoptic segmentation network. In Proceedings of the IEEE/CVF Conference on Computer Vision and Pattern Recognition, pp. 8818-8826, 2019.

Nicolas Carion et al. End-to-end object detection with transformers. In ECCV, 2020. (26 pages).

Sukjun Hwang et al. Video instance segmentation using inter-frame communication transformers. Advances in Neural Information Processing Systems, 34:13352-13363, 2021.

Junfeng Wu et al. Seqformer: a frustratingly simple model for video instance segmentation. arXiv preprint arXiv:2112.08275, 2021. (11 pages).

* cited by examiner

TRANSFORMER-BASED OBJECT DETECTION

TECHNICAL FIELD

The embodiments described herein pertain generally to object detection within the context of computer vision.

BACKGROUND

Under the broad technology of computer vision are the localizing and categorizing one or more objects of interest in a given image. Fundamental to such tasks is object detection and object segmentation. Transformer-based detection and segmentation models use basic queries for different objects, implementing a multi-stage attention process. Thus, the fixed queries serve as global priors for both location and semantics of target objects within an input image.

SUMMARY

In one example embodiment, a method of detecting objects using a transformer-based object detection model includes generating modulated queries based on basic queries of the transformer-based object detection model, training the model using the basic queries and the modulated queries, replacing the basic queries with the modulated queries as input for a transformer decoder that is to execute the trained transformer-based object detection model, and inputting the modulated queries and extracted image features to the transformer decoder.

In accordance with at least one other example embodiment, a non-volatile computer-readable medium that, when executed, causes at least one processor to perform operations related to object detection, that include: receiving an input image, generating dynamic detection queries based on basic queries and semantics of the input image, training a transformer-based object detection model using the basic queries and the dynamic detection queries, and performing object detection based on the dynamic detection queries using the trained transformer-based object detection model.

In accordance with at least one other example embodiment, a transformer-based object detector includes: a feature extraction module, a global pooling module to calculate combination coefficients using output from the feature extraction module, a dynamic detection query generator to generate dynamic detection queries as a function of the combination coefficients and basic queries for a transformer-based object detection model, and a transformer decoder to receive the output from the feature extraction module and the dynamic detection queries as input for performing object detection.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described and recited herein, as well as illustrated in the drawings, may be arranged, substituted, combined, separated, and designed in a wide variety of different configurations, all of which are explicitly contemplated herein.

Additionally, portions of the present disclosure may be described herein in terms of functional block components and various processing steps. It should be appreciated that such functional blocks may be realized by any number of hardware and/or software components configured to perform the specified functions.

In the present description and recitation, the following terms may provide context for embodiments described, recited, and/or suggested herein; and may also be used, in addition to their accepted meaning, as follows.

Artificial intelligence, alternatively referenced herein as "AI," may refer to a learned or trained computer or processor-related technology by which decisions and/or actions are autonomously made, in place of human intervention. AI refers to software, i.e., algorithms and/or programs, hardware or firmware, or any combination thereof that supports machine learning, natural language understanding, natural language processing, speech recognition, computer vision, etc. Also included among the range of AI functions and capabilities, and pertinent to the embodiments disclosed, recited, and suggested herein, object detection or segmentation relative to an input image, images, or video.

An engine or generator, as disclosed, recited, and/or suggested herein, may refer to a type of software, firmware, hardware, or any combination thereof, that facilitates generation of source code or markup to produce elements that begin another process. In addition, or alternatively, an engine or generator may facilitate automated processes, in which various software elements interact to produce an intended product, whether physical or virtual based on natural language descriptions, inputs, or other prompts. In accordance with known AI technologies, the AI engines or generators disclosed, recited, and/or suggested herein are trained in accordance with either unimodal or multimodal training models.

Object detection, in accordance with computer vision and image processing, may refer to technologies that are designed, programmed, or otherwise configured to detect instances of semantic objects of a certain class in digital images and/or videos. Non-limiting contextual applications for object detection may include image retrieval, video surveillance, device security, etc.

Object segmentation, in accordance with computer vision and image processing, may refer to technologies that are designed, programmed, or otherwise configured to partition a digital image into multiple image segments, i.e., image regions or image objects, to simplify and/or change a representation of the original image into a format that is more easily managed and/or analyzed.

Queries, as disclosed and recited herein in accordance with known object detection and segmentation technologies, may respectively refer to a representation of an object. Each query may represent an object and having multiple representations referring to classification, box regression and mask encoding simultaneously in vector form. For known object detection and segmentation technologies, basic queries are fixed for different objects in every input image.

A social media application, as disclosed and recited herein, may refer to an on-line application that allows account-holding users to interact with one another using various media and on varying scales, with such interaction including creating and/or sharing media content. As disclosed and recited herein, a user device may have an instance of social media application account stored locally or may access the user's account via a web-based version of the particular social media application.

A platform, e.g., a social media platform, as disclosed and recited herein, may refer to an application on which algorithms and/or programs enabling execution or implementation of a collection of communication-based or media-sharing technologies may be hosted. Further, any algorithm or program described, recited, or suggested herein may be executed by one or more processors hosted on such a platform. Non-limiting examples of such technologies may include the creation, sharing, and/or storage of multi-media offerings.

Media, or multi-media, offerings or experiences, as referenced herein, may include but not be limited to recorded or live transmittable content including text, audio, images, animations, video, etc. In addition, such offerings or experiences may include, but again not be limited to, interactive augmented reality (AR) and/or interactive virtual reality (VR) experiences.

Figure 1:
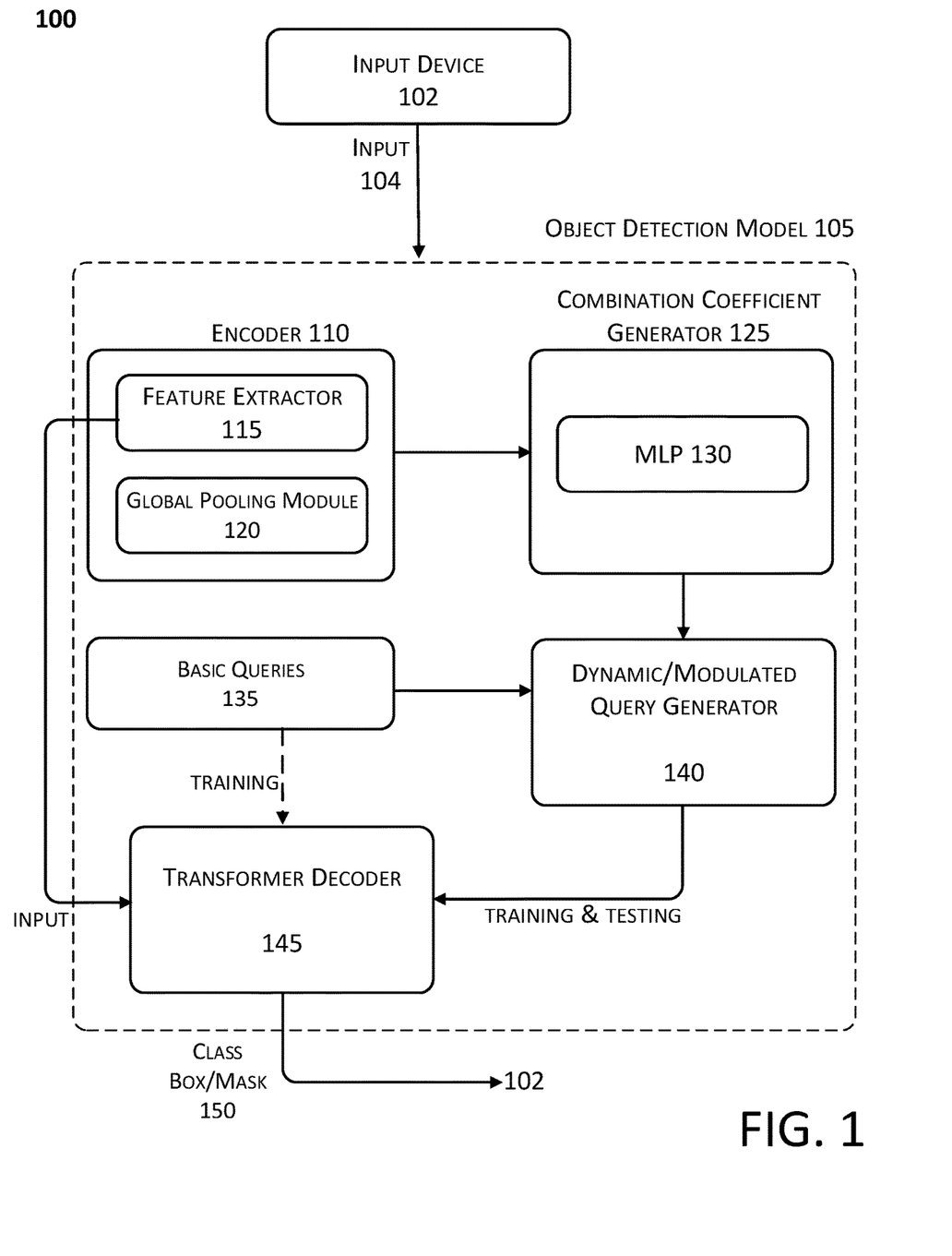
FIG. 1 shows a system in which transformer-based object detection may be implemented, arranged in accordance with at least some embodiments described and recited herein.

FIG. 1 shows a system in which transformer-based object detection may be implemented, arranged in accordance with at least some embodiments described and recited herein. As depicted, system 100 includes input device 102 and object detection model 105. Object detection model 105 includes, at least, encoder 110, which includes feature extractor 115 and global pooling module 120; combination coefficient generator 125, which implements multilayer perceptron (MLP) 130; basic queries 135; dynamic/modulated query generator 140; and transformer decoder 145. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

Input device 102 may refer to one or more embodiments of a classical computing environment that may be, or include, a classical computer, processing device, a microprocessor, a microcontroller, a digital signal processor, or any combination thereof. Device 102 may be one of various electronic devices, or a combination thereof, having one or more image and/or video capturing components, i.e., camera and/or video recorder, display screens with audio and/or video inputs/outputs and that support the providing of and consumption of content relative to a media platform. The various electronic devices may include but not be limited to a security/surveillance device, smartphone, a tablet computer, a laptop computer, a desktop computer, an e-book reader, an MP3 (moving picture experts group audio layer III) player, an MP4, and/or any other suitable electronic devices. Non-limiting examples of input device 102 as a security device may include a video doorbell, a vehicle dash-cam, a security camera (whether constantly active or motion-activated), etc. Additional non-limiting examples of input device 102 may include a database, local server, cloud-based service, a virtual reality (VR) and/or augmented reality (AR) servers, etc. Further, any algorithm or program described, recited, or suggested herein may be executed by one or more processors hosted on input device 102.

Input 104, in accordance with at least some of the embodiments disclosed and recited herein, may refer to digital images, digital video, text, and/or audio that may be input manually or in an automated manner to an appropriate input interface. Input 104 may be transmitted or otherwise communicated from input device 102 to a receiving component corresponding to object detection model 105 via a wired or wireless network. Such network may be regarded as a medium that is provided as a bidirectional communications link between a media platform on which object detection model 105 is hosted and input device 102. The network may include the Internet, a local area network (LAN), a wide area network (WAN), a local interconnect network (LIN), a localized cloud, etc.

Object detection model 105 may refer to AI-based implementation of, e.g., algorithms and/or programs, hardware or firmware, or any combination thereof, to categorize, detect, isolate, and/or localize objects and/or segments of interest in an input 104 image, images, and/or video. A non-limiting example of such model may be a Detection Transformer (DETR) model. Object detection model 105 may be hosted on one or multiple servers, on the order of hundreds to thousands, which may be hosted on a cloud-based infrastructure. Further, object detection model 105 may be implemented by single or multiple classical computers, and facilitate transmissions with one or more of input devices 102 across single or multiple connections or channels.

As described and recited herein, object detection model 105 may be regarded as a transformer-based encoder-decoder architecture, e.g., DETR. Accordingly, an encoder includes encoding layers that processes input iteratively and a decoder process output iteratively.

Encoder 110 may refer to a component or module that is designed, programmed, or otherwise configured to receive input 104 image, images, and/or video from input device 102. For the purposes of this description, but not in any limiting manner, encoder 110 may include feature extractor 115 and global pooling module 120.

Feature extractor 115 may refer to a component or module that is designed, programmed, or otherwise configured to iteratively extract, from input 104 received at encoder 110, information from the input 104 content in accordance with known extraction technologies. Non-limiting examples of extracted features may include persons (intact or in part), objects, edges, points, boundaries, curves, shapes, etc. Such features may be regarded as high-level content of the input images, typically corresponding to semantics of the respective images.

As indicated prior, non-limiting contextual applications for object detection may include image editing, video surveillance, device security, etc., and therefore a definition or parameters of a feature that is subject to extraction by feature extractor 115 may be dependent upon the contextual application.

Global pooling module 120 may refer to a component or module corresponding to object detection model 105 that is designed, programmed, or otherwise configured to determine a global average pooling of the extracted feature vectors or maps corresponding to features corresponding to input 104 that are extracted by feature extractor 115.

Combination coefficient generator 125 may refer to a component or module corresponding to object detection model 105 that is designed, programmed, or otherwise configured to generate a combination coefficient by inputting the calculated global feature, which includes semantics of input 104, to MLP 130.

MLP 130 refers to a multilayer perceptron (MLP), which is a feedforward artificial neural network, designed, programmed, or otherwise configured to generate combination coefficients, in accordance with the embodiments described, recited, and suggested herein. For the purposes of this description, but not in any limiting manner, MLP 130 may affect a global average pooling of the feature vectors or maps determined by global pooling module 120 corresponding to encoder 110 to generate combination coefficients corresponding to semantics of input 104, serving as a basis for dynamic/modulated queries.

Basic queries 135 may refer to fixed queries corresponding to object detection model 105 that each represent an object and having multiple representations for class, box, mask, etc., for the transformer-based object detection model 105. Basic queries 135 are each a fixed vector and are therefore the same for any image input to object detection model 105.

Dynamic/modulated query generator 140 may refer to a component or module corresponding to object detection model 105 that is designed, programmed, or otherwise configured to generate dynamic/modulated queries by modulating the initialized basic queries. Dynamic/modulated query generator 140 performs a convex combination on the generated combination coefficients and the initialized basic queries. Thus, because the combination coefficients are generated based on the global features of the feature maps of input 104 images, dynamic/modulated queries are generated in accordance with the semantics for each input 104 image.

Transformer decoder 145, as described, recited, and suggested herein, may refer to a trained executing component or module for object detection model 105. In accordance with the embodiments described and recited herein, transformer decoder 145 is designed, programmed, or otherwise configured to detect, as trained, objects in accordance with the semantics of the input 104 images.

As shown in FIG. 1, transformer decoder 145 receives input for training purposes that includes the initialized basic queries and the generated dynamic/modulated queries. The dynamic/modulated queries are modulations of the basic queries based on the combination coefficients that are generated based on the global features of the feature maps of input 104 images.

Transformer decoder 145 is further designed, programmed, or otherwise configured to generate or produce the output 150 of transformer-based object detection model 105. In accordance with the embodiments described and recited herein, trained transformer decoder 145 receives features extracted from input 104 from feature extractor 115 and also receives dynamic/modulated queries from dynamic/modulated query generator 140. That is, the initialized basic queries are input to transformer decoder 145 for training purposes only but are not input to transformer decoder 145 for execution or implementation of object detection. Thus, the input to transformer decoder 145 includes the extracted features and the dynamic/modulated queries.

Object detection model 105, including transformer decoder 145, may refer to an AI algorithm, program, component, and/or module that is hosted on or remotely and communicatively corresponds to a media platform, including but not limited to a social media platform, a security/surveillance platform, etc. Transformer decoder 145 may be designed, programmed, or otherwise configured to output 150 classifications, boxes, and/or masks corresponding to objects within input 104 images that are input or subject to objection detection model 105.

Object detection model 105 may be implemented in accordance with an on-line application that allows account-holding users to interact with one another using various media and on varying scales, with such interaction including creating and/or sharing media content. As disclosed and recited herein, device 102 may have an instance of social media application account stored locally or may access a user's account via a web-based version of the particular social media application.

A platform, e.g., a social media platform and/or a security/surveillance platform, as disclosed and recited herein, may refer to an application on which algorithms and/or programs enabling execution or implementation of a collection of communication-based or media-sharing technologies may be hosted. Such technologies include monitoring, creating, sharing, and/or storing multi-media offerings.

Any one or more of a server or cluster of servers upon which a media platform is hosted, and object detection model 105 is executed or implemented, may refer to a high-performance computing (HPC) environment that includes, at least, a CPU and GPU that is present on a, e.g., a video card, embedded on a motherboard, or on the CPU die. The training and/or resulting object detection may be executed entirely on the CPU or in part on the CPU and the GPU. Alternative embodiments may be executed in evolved HPC components known in the art. Regardless, the CPU, GPU, and/or HPC components may store one or more algorithms and/or programs that, when executed thereon, may cause the execution or performance of operations and/or functionality as disclosed and/or recited herein. Also, a computer-readable non-volatile medium may be provided according to the embodiments described herein. The computer readable medium stores computer programs. The computer programs are used to, when being executed by a processor, execute or perform the operations or functionality in connection with at least the embodiments described and recited herein.

Figure 2A:
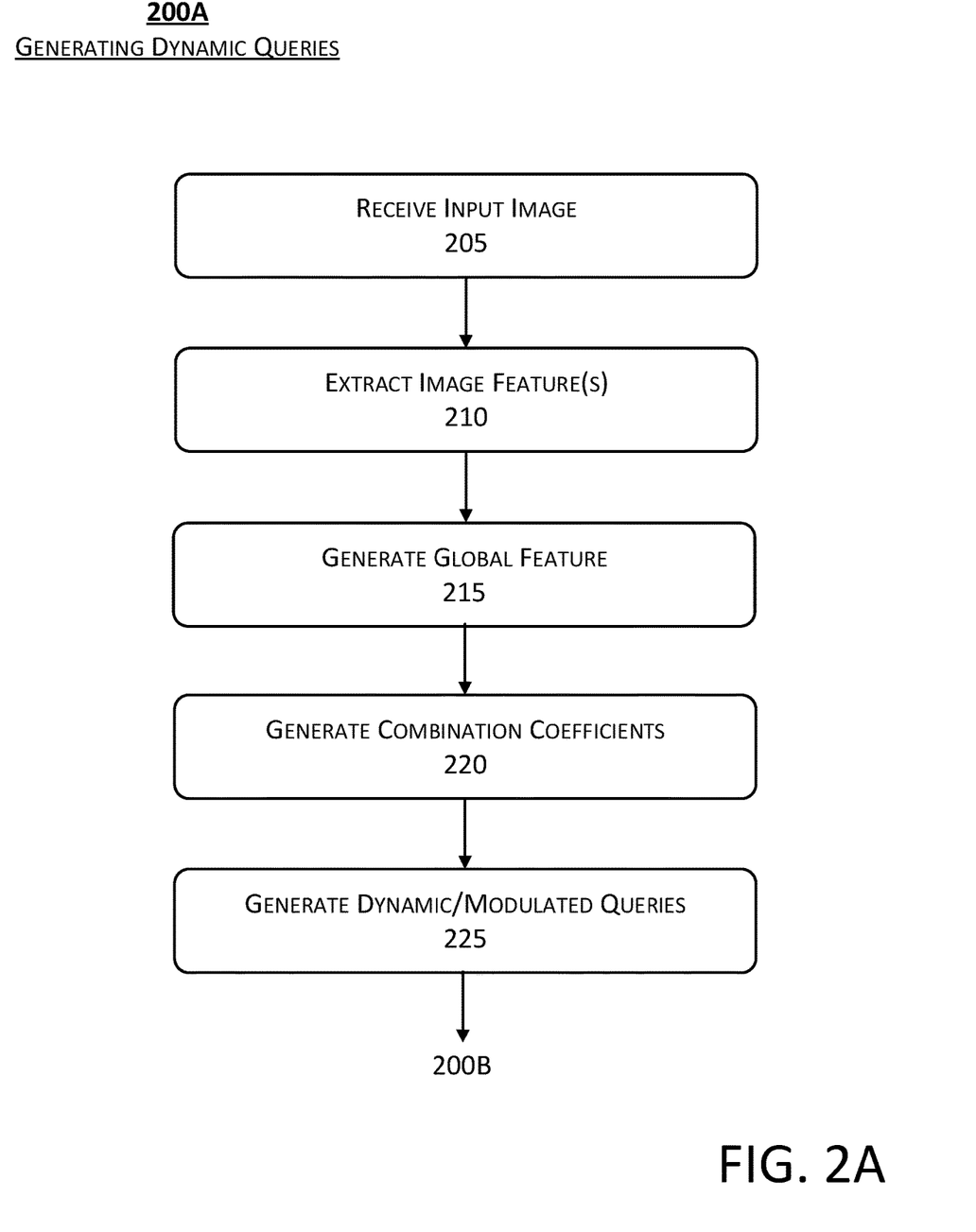
FIG. 2A shows at least a portion of an example processing flow for implementation of transformer-based object detection, pertaining to generation of dynamic or modulated queries, in accordance with at least some embodiments described and recited herein.
Figure 2B:
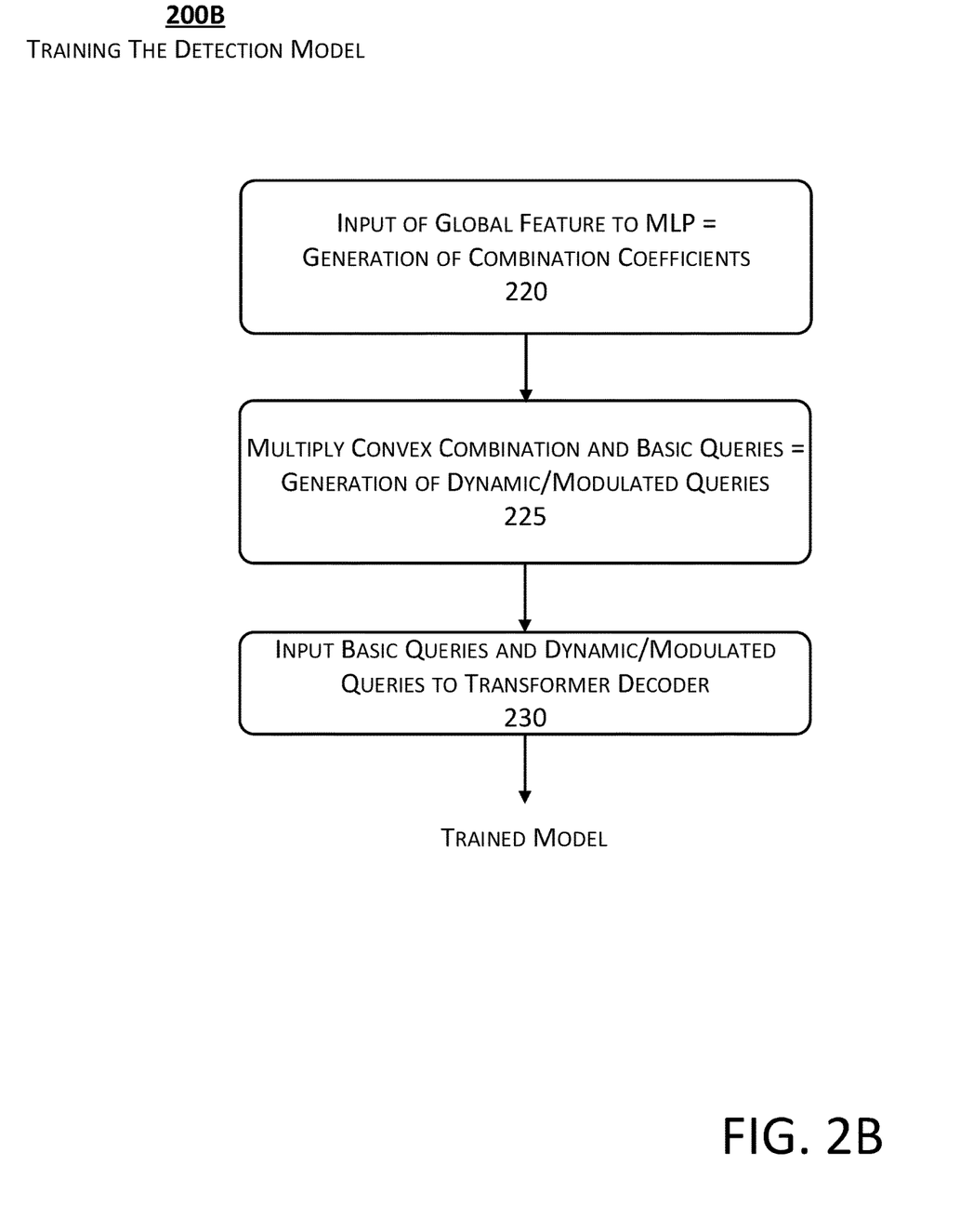
FIG. 2B shows at least a portion of an example processing flow for implementation of transformer-based object detection, pertaining to training of a detection model, in accordance with at least some embodiments described and recited herein.
Figure 2C:
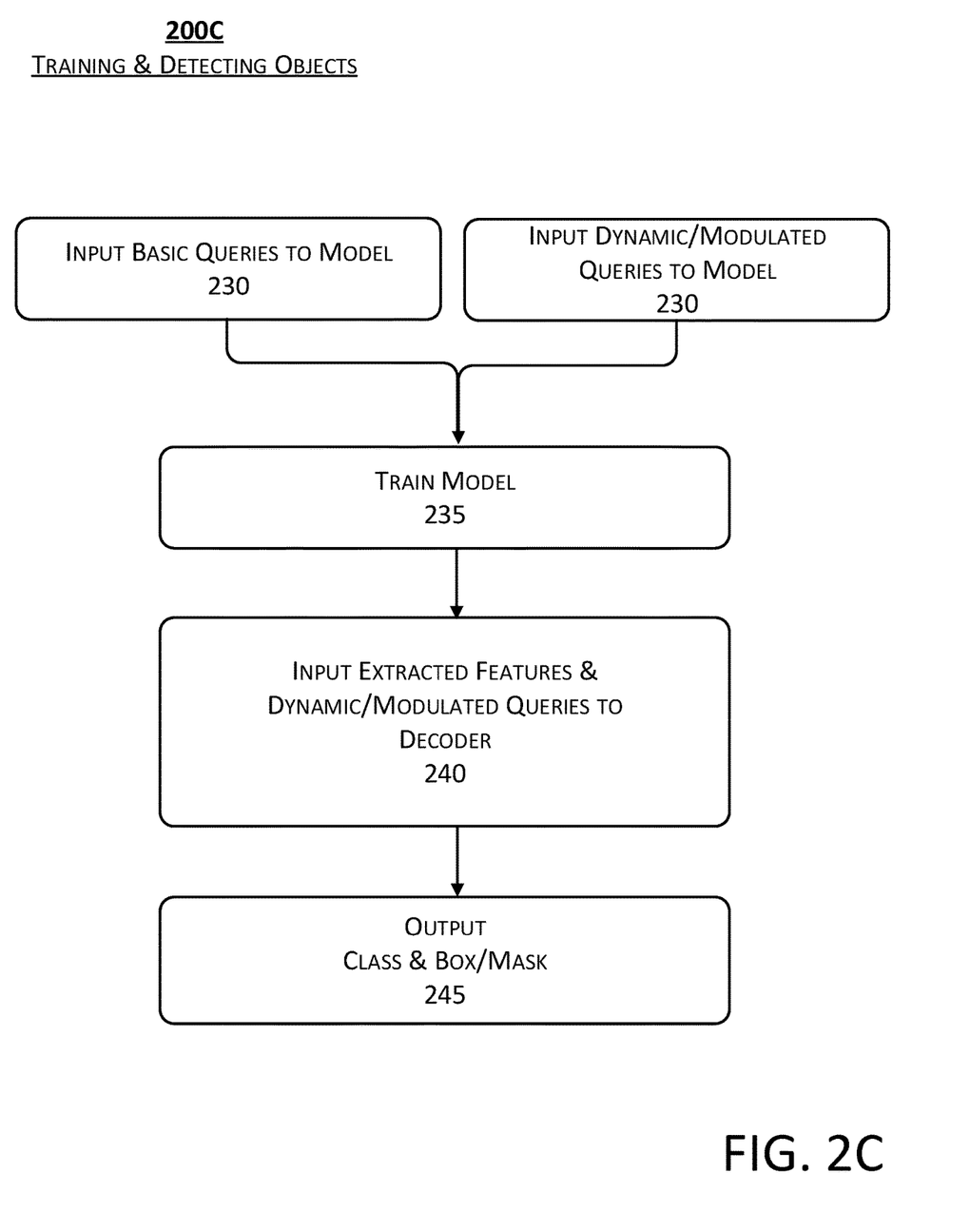
FIG. 2C shows at least a portion of an example processing flow for implementation of transformer-based object detection, pertaining to execution of the trained model, in accordance with at least some embodiments described and recited herein.

FIGS. 2A-2C may be combined to show an example processing flow for implementation of transformer-based object detection and/or segmentation, in accordance with at least some embodiments described, recited, and even suggested herein. It is understood that each function and/or operation shown and described with reference to any of FIGS. 2A-2C may be implemented, individually and/or collectively, by a wide range of hardware, software, firmware, or any combination thereof, such as those illustrated, described, and even suggested in accordance with FIG. 1.

FIG. 2A shows example sub-processing flow 200A for implementation of transformer-based object detection, pertaining to generation of dynamic/modulated queries, in accordance with at least some embodiments described and recited herein. As shown, generation of dynamic/modulated queries includes at least blocks 205, 210, 215, 220, and 225.

FIG. 2B shows example sub-processing flow 200B for implementation of transformer-based object detection, pertaining to training of a detection model, in accordance with at least some embodiments described and recited herein. As shown, training of a detection model includes at least blocks 220, 225, and 230.

FIG. 2C shows example processing flow 200C for training and implementing transformer-based object detection, pertaining to execution of the trained model, in accordance with at least some embodiments described and recited herein. As shown, the detecting of objects includes at least blocks 230, 235, 240, and 245.

Illustrated sub-processes 200A, 200B, and 200C may be combined for transformer-based object detection and/or segmentation. Further, the description of 200B may overlap with that of 200A and the description of 200C may overlap with that of 200B. Thus, it is to be understood that there is no clear distinction between 200A, 200B, and 200C, which are divided herein for illustrative and descriptive purposes only; and the descriptions are not intended to be so limiting in any manner.

Process 200A for generating dynamic or modulated queries may begin at block 205.

At block 205 (receive input image), encoder 110 may receive input 104 image, images, and/or video from input device 102, which may be one of various electronic devices, or a combination thereof, having one or more image and/or video capturing components, i.e., camera and/or video recorder, display screens with audio and/or video inputs/outputs and that support the providing of and consumption of content relative to a media platform. Non-limiting examples of device 102 may include a smartphone, a tablet computer, a laptop computer, a desktop computer, etc.; therefore, input 104 may be received as an image, series of continuous images, and/or video. Processing may proceed to block 210.

At block 210 (extract image feature(s)), feature extractor 115 extracts, from input 104 received at encoder 110, information from input 104 using known extraction techniques by which high-level content, i.e., semantics, of input 104 may be extracted. Processing may proceed to block 215.

At block 215 (generate global feature), global pooling module 120 determine a global average pooling of the extracted feature vectors or maps that respectively correspond to the high-level content, i.e., semantics, of content 104 that is extracted by feature extractor 115. Processing may proceed to block 220.

At block 220 (generate combination coefficients), MLP 130 generates a combination coefficient by inputting the determined global feature to combination coefficient generator 125. Processing may proceed to block 230.

At block 225 (generate dynamic/modulated queries), dynamic/modulated query generator 140 converts initialized basic queries 135 into dynamic/modulated queries by performing convex combination of the generated combination coefficients and the initialized basic queries.

Processing may proceed to the description of sub-processing flow 200B, pertaining to training of a detection model, which may include the operation at block 220.

At block 220 (input of global feature to MLP), combination coefficients are generated by inputting a generated global feature to MLP 130, corresponding to combination coefficient generator 125. Processing may proceed to block 225.

At block 225 (multiply convex combination and basic queries . . . ), dynamic/modulated queries are generated by a convex multiplication between the combination coefficients generated by MLP 130 and the initialized basic queries for the transformer-based object detection model at dynamic/modulated query generator 140. Processing may proceed to block 230.

At block 230 (input basic queries and dynamic/modulated queries . . . ), transformer decoder 145 is trained for subsequent predictions for object detection based on the initialized basic queries for the transformer-based object detection model and the generated dynamic-modulated queries that are based on the semantics of input 104 image or images.

Processing may proceed to the description of sub-processing flow 200C, pertaining to training and detecting objects in accordance with the trained transformer-based object detection model 105, which may include the operation at block 230.

At block 230 (input basic queries and dynamic/modulated queries to model), initialized basic queries and generated dynamic/modulated queries are input to train transformer decoder 145. Processing may proceed to block 235.

At block 235 (train model), transformer decoder 145 is trained based on the input from block 230, including basic queries corresponding to the model and modulations of the basic queries. Accordingly, it is understood that hundreds or even thousands of iterations of operations 205-230 may be repeated to train the transformer based object detection model.

At block 240 (input extracted features and dynamic/modulated queries . . . ), transformer decoder 145 executes the trained model based on the input of the dynamic/modulated queries generated by dynamic/modulated query generator 140 and extracted features from feature extractor 115. That is, in accordance with the embodiments described, recited, and suggested herein, while the initialized basic queries are input to transformer decoder 145 for training purposes, the basic queries are not input to transformer decoder 145 for execution or implementation of object detection. Processing may proceed to block 245.

At block 245 (output class & box/mask), transformer decoder 145 executes object detection in accordance with the trained model by outputting classifications of boxed and/or masked objects in an input image.

Figure 3:
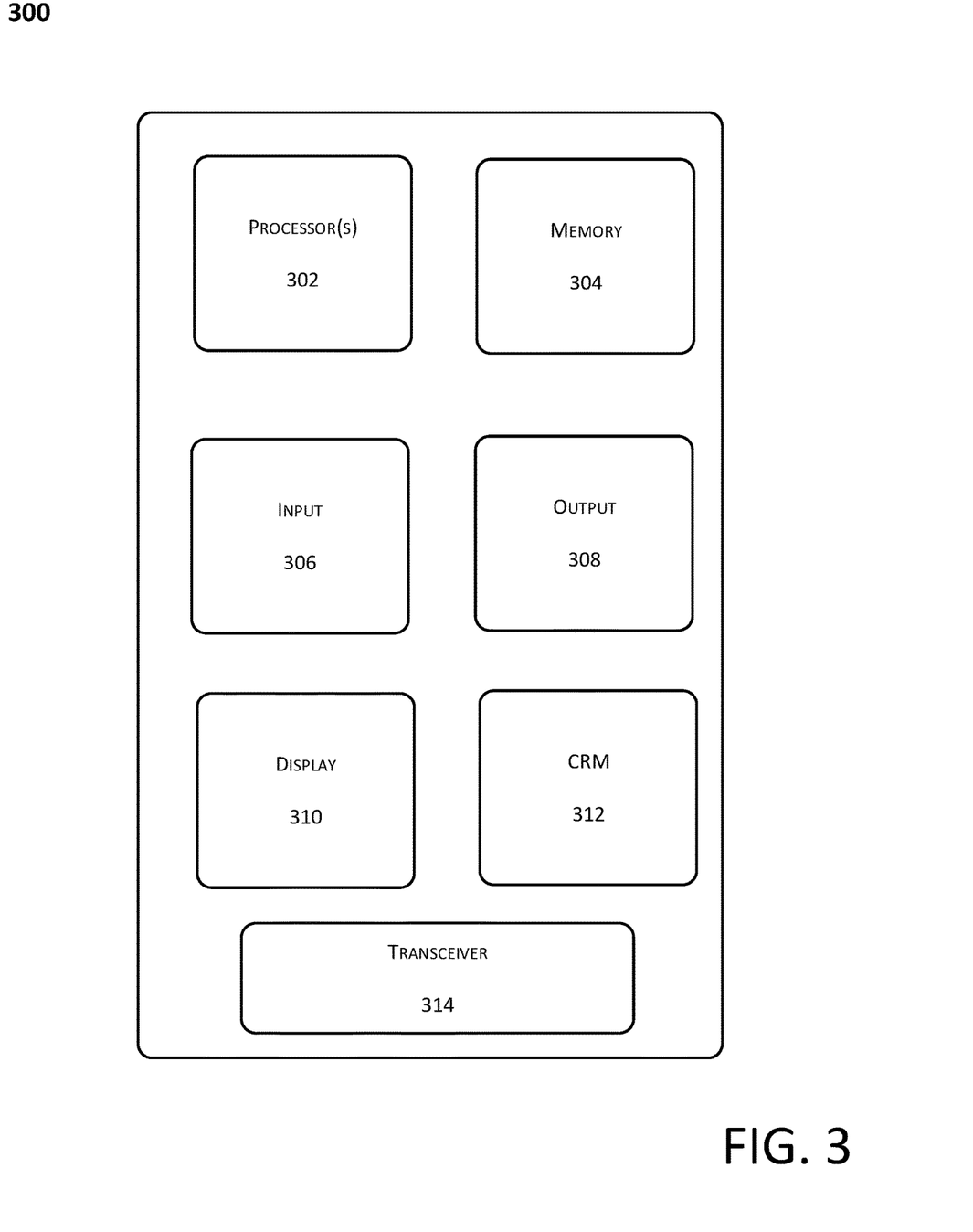
FIG. 3 shows an illustrative computing embodiment, in which any of the processes and sub-processes of procuring 3D images based on text input may be implemented as executable instructions stored on a non-volatile computer-readable medium.

FIG. 3 shows an illustrative computing embodiment, in which any of the processes and sub-processes transformer-based object detection may be implemented as executable instructions stored on a non-volatile computer-readable medium. The computer-readable instructions may, for example, be executed by a processor of a device, as referenced herein, having a network element and/or any other device corresponding thereto, particularly as applicable to the applications and/or programs described above corresponding to system 100.

In a very basic configuration, a computing device 300 may typically include, at least, one or more processors 302, a memory 304, one or more input components 306, one or more output components 308, a display component 310, a computer-readable medium 312, and a transceiver 314.

Processor 302 may refer to, e.g., a microprocessor, a microcontroller, a digital signal processor, or any combination thereof.

Memory 304 may refer to, e.g., a volatile memory, non-volatile memory, or any combination thereof. Memory 304 may store, therein, an operating system, one or more applications corresponding to model 105 and/or program data therefore. That is, memory 304 may store executable instructions to implement any of the functions or operations described above and, therefore, memory 304 may be regarded as a computer-readable medium.

Input component 306 may refer to a built-in or communicatively coupled keyboard, touch screen, or telecommunication device. Alternatively, input component 306 may include a microphone that is configured, in cooperation with a voice-recognition program that may be stored in memory 304, to receive voice commands from a user of computing device 300. Further, input component 306, if not built-in to computing device 300, may be communicatively coupled thereto via short-range communication protocols including, but not limitation, radio frequency or Bluetooth®.

Output component 308 may refer to a component or module, built-in or removable from computing device 300, that is configured to output commands and data to an external device.

Display component 310 may refer to, e.g., a solid state display that may have touch input capabilities. That is, display component 310 may include capabilities that may be shared with or replace those of input component 306.

Computer-readable medium 312 may refer to a separable machine-readable medium that is configured to store one or more programs that embody any of the functions or operations described above. That is, computer-readable medium 312, which may be received into or otherwise connected to a drive component of computing device 300, may store executable instructions to implement any of the functions or operations described above. These instructions may be complimentary or otherwise independent of those stored by memory 304.

Transceiver 314 may refer to a network communication link for computing device 300, configured as a wired network or direct-wired connection. Alternatively, transceiver 314 may be configured as a wireless connection, e.g., radio frequency (RF), infrared, Bluetooth®, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Aspects

Aspect 1. A method of detecting objects using a transformer-based object detection model, comprising:
  generating modulated queries based on basic queries of a transformer-based object detection model;
  training the transformer-based object detection model using the basic queries and the modulated queries;
  replacing the basic queries with the modulated queries as input for a transformer decoder that is to execute the trained transformer-based object detection model; and
  inputting the modulated queries and extracted image features to the transformer decoder.

Aspect 2. The method of Aspect 1, wherein the generating of the modulated queries includes generating convex combinations of the basic queries to produce the modulated queries.

Aspect 3. The method of Aspect 2, wherein the generating of the convex combinations is based on combination coefficients generated by inputting global features of the extracted image features to a multi-layer perceptron (MLP).

Aspect 4. The method of any of Aspects 1-3, wherein the extracted image features include image features extracted from input images.

Aspect 5. A non-volatile computer-readable medium having computer-executable instructions stored thereon that, when executed, causes at least one processor to perform operations related to object detection comprising:
  receiving an input image;
  generating dynamic detection queries based on basic queries and semantics of the input image;
  training a transformer-based object detection model using the basic queries and the dynamic detection queries; and
  performing object detection based on the dynamic detection queries using the trained transformer-based object detection model.

Aspect 6. The non-volatile computer-readable medium of Aspect 5, wherein the generating of the dynamic detection queries comprises:
  calculating a global feature as a global average pooling of a feature map of the semantics of the input image;
  generating combination coefficients by inputting the global feature to a multi-layer perceptron (MLP); and
  performing a convex calculation of the combination coefficients and the basic queries to generate the dynamic detection queries.

Aspect 7. The non-volatile computer-readable medium of Aspect 6, wherein the calculating is based on features extracted from input images.

Aspect 8. The non-volatile computer-readable medium of any of Aspects 5-7, wherein the performing of object detection using the trained transformer-based object detection model includes replacing the basic queries with the modulated queries.

Aspect 9. The non-volatile computer-readable medium of any of Aspects 5-7, wherein the performing of object detection is by a DETR transformer decoder.

Aspect 10. The non-volatile computer-readable medium of any of Aspects 5-9, wherein the at least one processor executes on a server corresponding to a social media platform.

Aspect 11. The non-volatile computer-readable medium of any of Aspects 5-9, wherein the at least one processor executes on a smart device.

Aspect 12. A transformer-based object detector, comprising:
- a feature extraction module;
- a global pooling module to calculate combination coefficients using output from the feature extraction module;
- a dynamic detection query generator to generate dynamic detection queries as a function of the combination coefficients and basic queries for a transformer-based object detection model; and
- a transformer decoder to receive the output from the feature extraction module and the dynamic detection queries as input for performing object detection.

Aspect 13. The transformer-based object detector of Aspect 12, wherein the detector executes a DETR object detection model.

Aspect 14. The transformer-based object detector of either Aspect 12 or Aspect 13, wherein the global pooling module:
- receives the output from the feature extraction module;
- calculates a global feature of the extracted images; and
- inputs the global feature to a multi-layer perceptron (MLP) to generate the combination coefficients.

Aspect 15. The transformer-based object detector of any of Aspects 12-14, wherein the output from the feature extraction module includes features extracted from input images.

Aspect 16. The transformer-based object detector of any of Aspects 12-15, wherein the dynamic detection query generator generates the dynamic detection queries by performing a convex calculation of the combination coefficients and the basic queries.

Aspect 17. The computer-readable medium of any of Aspects 12-16, wherein the input for performing object detection excludes the basic queries for a transformer-based feature extraction module.

What is claimed:

1. A method of detecting objects using a transformer-based object detection model, comprising:
   - generating modulated queries based on basic queries of a transformer-based object detection model and extracted image features of an input image;
   - training the transformer-based object detection model using the basic queries and the modulated queries;
   - replacing the basic queries with the modulated queries as input for a transformer decoder that is to execute the trained transformer-based object detection model; and
   - inputting the modulated queries and the extracted image features to the transformer decoder.

2. The method of claim 1, wherein the generating of the modulated queries includes generating convex combinations of the basic queries to produce the modulated queries.

3. The method of claim 2, wherein the generating of the convex combinations is based on combination coefficients generated by inputting global features of the extracted image features to a multi-layer perceptron (MLP).

4. The method of claim 1, wherein the extracted image features include image features extracted from input images.

5. A non-volatile computer-readable medium that, when executed, causes at least one processor to perform operations related to object detection comprising:
   - receiving an input image;
   - generating dynamic detection queries based on basic queries and semantics of the input image;
   - training a transformer-based object detection model using the basic queries and the dynamic detection queries; and
   - performing object detection based on the dynamic detection queries using the trained transformer-based object detection model.

6. The non-volatile computer-readable medium of claim 5, wherein the generating of the dynamic detection queries comprises:
   - calculating a global feature as a global average pooling of a feature map of the semantics of the input image;
   - generating combination coefficients by inputting the global feature to a multi-layer perceptron (MLP); and
   - performing a convex calculation of the combination coefficients and the basic queries to generate the dynamic detection queries.

7. The non-volatile computer-readable medium of claim 6, wherein the calculating is based on features extracted from input images.

8. The non-volatile computer-readable medium of claim 5, wherein the performing of object detection using the trained transformer-based object detection model includes replacing the basic queries with modulated queries.

9. The non-volatile computer-readable medium of claim 5, wherein the performing of the object detection is by a DETR transformer decoder.

10. The non-volatile computer-readable medium of claim 5, wherein the at least one processor executes on a server corresponding to a social media platform.

11. The non-volatile computer-readable medium of claim 5, wherein the at least one processor executes upon a smart device.

12. An apparatus comprising:
   - at least one processor; and
   - at least one computer-readable medium that, when executed, causes the at least one processor to perform operations comprising:
     - extracting features from an input image;
     - calculating combination coefficients using output from the features;
     - generating dynamic detection queries as a function of the combination coefficients and basic queries for a transformer-based object detection model; and
     - performing object detection based on the features and the dynamic detection queries.

13. The apparatus of claim 12, wherein the apparatus executes a DETR object detection model.

14. The apparatus of claim 12, wherein calculating the combination coefficients comprise:
   - receiving the features extracted from the input image;
   - calculating a global feature of the extracted images; and
   - inputting the global feature to a multi-layer perceptron (MLP) to generate the combination coefficients.

15. The apparatus of claim 14, wherein the dynamic detection queries are generated by performing a convex calculation of the combination coefficients and the basic queries.

16. The apparatus of claim 12, wherein inputs for performing the object detection excludes the basic queries.

* * * * *